United States Patent [19]

Teshima et al.

[11] Patent Number: 4,647,902

[45] Date of Patent: * Mar. 3, 1987

[54] DISPLAY UNIT OF FUEL CONSUMPTION METER FOR AUTOMOBILE

[75] Inventors: Tohru Teshima, Yokohama; Chihiro Funaoka, Tokyo, both of Japan; Pierre H. Robert, Bougival, France

[73] Assignees: Regie Nationale des Usines Renault, Boulogne-Billancourt, France; Stanley Electric Co., Ltd., Tokyo, Japan

[ * ] Notice: The portion of the term of this patent subsequent to Mar. 3, 2004 has been disclaimed.

[21] Appl. No.: 484,578

[22] Filed: Apr. 13, 1983

[30] Foreign Application Priority Data

Apr. 20, 1982 [JP] Japan ................................ 57-64873

[51] Int. Cl.⁴ .............................................. B60Q 1/00
[52] U.S. Cl. ............................ 340/52 R; 340/815.01; 340/753; 340/715
[58] Field of Search .............. 340/52 R, 52 F, 815.01, 340/753, 754, 715, 709, 721, 722, 670, 62; 324/115

[56] References Cited

U.S. PATENT DOCUMENTS 4,210,908  7/1980  Sakakibara ......................... 340/754
4,251,769  2/1981  Ewert et al. ..................... 340/753 X Primary Examiner—John W. Caldwell, Sr.
Assistant Examiner—Tyrone Queen
Attorney, Agent, or Firm—Oblon, Fisher, Spivak, McClelland & Maier

[57] ABSTRACT

A display unit of a fuel consumption meter for an automobile, wherein a proper fuel consumption is determined and an actual fuel consumption is measured and signals corresponding thereto are applied to comparing circuit and bar graph detectors. The comparing circuit compares the amplitude to the signals corresponding to proper fuel consumption and actual fuel consumption, and the bar graph decoders, after decoding the signals into a format compatible with a bar graph display, transmits the signals to an EX-OR circuit and an OR circuit. A selector circuit controlled by the output of a comparing circuit selects either the output of the EX-OR circuit or that of the OR circuit for driving plural segments of a bar graph display which accordingly displays both proper fuel consumption and actual fuel consumption either by driving selected display signals corresponding thereto or by driving display segments corresponding to a maximum value thereof and by inhibiting the driving of at least one display segment common to both proper fuel consumption and actual fuel consumption.

1 Claim, 8 Drawing Figures

DISPLAY UNIT OF FUEL CONSUMPTION METER FOR AUTOMOBILE

FIELD OF THE INVENTION

This invention relates to a display unit of a fuel consumption meter for an automobile.

DESCRIPTION OF THE PRIOR ART:

With the exhaustion of oil resource and the sharp rise in oil prices of late, the economical running of an automobile is strongly required, and therefore a fuel consumption meter has been installed in advance or as an option on various types of automobiles for the purpose of improving a fuel consumption (to say more precisely, fuel consumption rate) at the time of running.

This type of fuel consumption meter indicates with a pointer or displays digitally the running distance per unit fuel or the fuel consumption per unit distance, enabling a driver to constantly know the fuel consumption at the time of running. Therefore, the driver is capable of performing proper driving, keeping an economical running by watching necessary meters such as a speedometer, tachometer, fuel meter, etc. on the dash board and by confirming numerical values shown on a fuel consumption meter during the running of the automobile. The above refers to the advantages brought about by this kind of fuel consumption meter. However, a conventional fuel consumption meter of this type has the disadvantage of not enabling the drive to judge whether or not fuel is consumed economically, because of proper fuel consumption is not displayed according to the cars speed changing from one minute to the next during operation.

SUMMARY OF THE INVENTION

Accordingly, one of the objects of this invention is to provide a fuel consumption meter for an automobile enabling a driver to drive the automobile, comparing two kinds of fuel consumption, by displaying simultaneously the proper fuel consumption changing according to car speeds, i.e., the economical fuel consumption in the case of selecting the transmission gear ration optimum to the automobile to be driven on flat ground under the condition of dead calm, and the actual fuel consumption, i.e., the fuel consumption at the time of actual running.

Another object of this invention is to provide a display unit of a fuel consumption meter for an automobile which displays the aforesaid proper fuel consumption and actual fuel consumption as a bar graph liquid crystal display device which a driving circuit, wherein the display device is small in size, low in price and easy for a driver to watch.

A further object of this invention is to provide a display unit of fuel consumption for an automobile in which the number of segments necessary to construct the bar graph are formed in arbitrary shape and are arranged adjacently in sequence while the aforesaid proper fuel consumption and actual fuel consumption are displayed by the selected activation of the dispaly segments so as to enable a driver clearly to distinguish the proper fuel consumption and actual fuel consumption on one and the same display device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

In the embodiment shown in the above described drawings, fuel consumption is expressed in liters of fuel consumed from each 100-km running.

DESCRIPTION OF THE PREFERRED EMBODIMENTS

Figure 1:
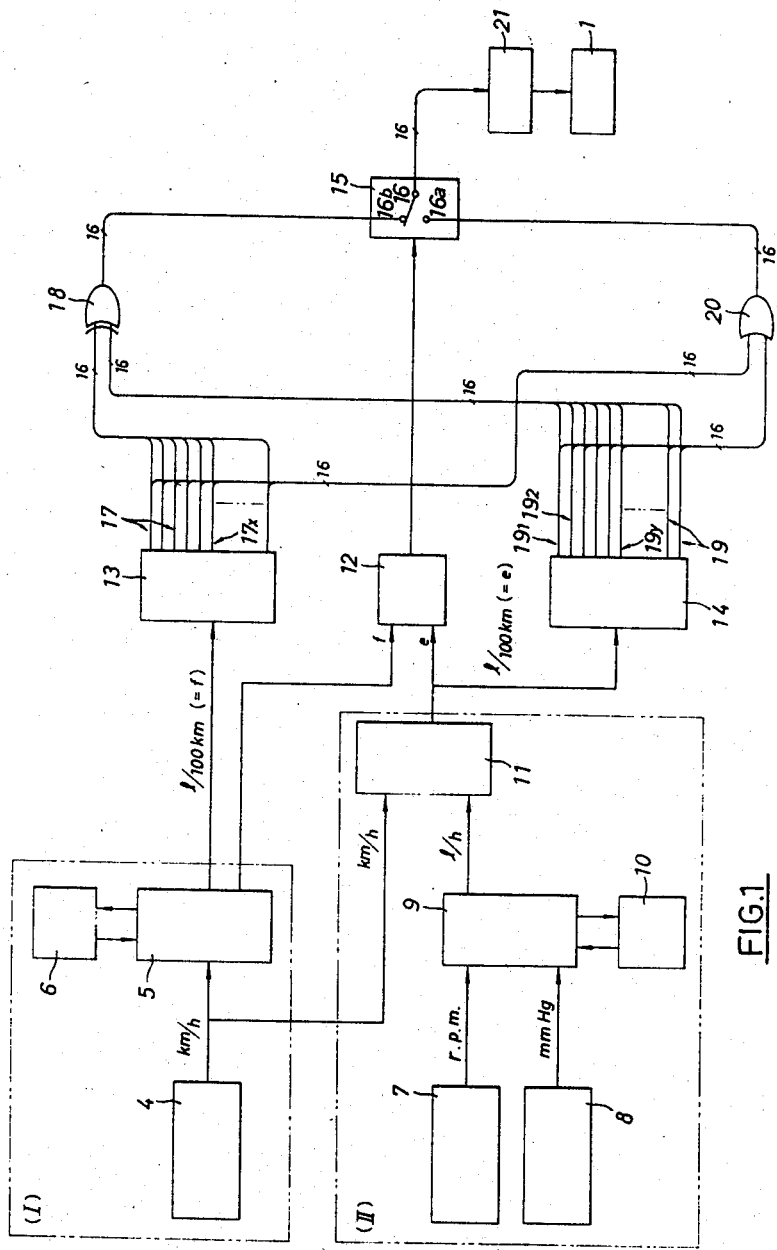
FIG. 1 is a block circuit diagram showing the whole of one embodiment of the display unit of a fuel consumption meter for an automobile according to this invention.

Referring now to the drawings, wherein like reference numerals designate identical or corresponding parts throughout the several views, and more particularly to FIG. 1 thereof, numeral 1 designates a display device which is formed a bar graph displaying a value A, including a necessary number using liquid crystal displaying segments 2. Namely, as shown, 16-display segments 2 which are each the same in size and being of long and narrow plates are arranged and connected together, so as to enable the display device 1 to display the fuel consumption ranging from 1 1/100 km to 16 1/100 km, with each one piece of segments 2 being used as one scale of the basic unit of 1 l. Numeral 3 designates the scales shown on the necessary positions of the display device 1.

Accordingly, the display device 1 is capable of displaying proper numerical values even as a result of changes in condition of light and darkness, transparency and turbidity, etc. These changes are caused by the changes of optical properties of the liquid crystal relative to the necessary segments 2 on which voltage is impressed, such that segments having voltage impressed thereon are optically different relative to other segments on which no voltage is impressed. And also, the display range may make the necessary construction easy to watch for a driver in the daytime and nighttime with transmitted light, reflected light, etc. by display means under DS (dynamic scattering) system, TN twisted nematic) system, ECB (electrically controlled birefringence) system, PC (phase change) system, etc. according to the difference in the mechanism transforming the optical changes in condition of the liquid crystal as caused by electric signals into optical information.

And further, as to the display device 1, each segment 2 can freely be arranged, for example in a right-to-left direction, or in an up-to-down direction as shown, and can be constructed with desired shapes without being limiting to the construction shown, while the display device 1 on the whole can be formed in a circular arc, circle, circular ring, etc. as desired according to the shapes of the individual segments.

Numeral 4 designates a car speed operational circuit which is arranged so as to make it possible to input car speed pulse signals according to speeds of automobile (this circuit makes it possible to transmit signals, by computing car speeds as the distance per average unit time (Km/h)), to the next stage continuously or at intervals of a desired set time. Numeral 5 designates a proper fuel consumption computing circuit and is connected with car speed operational circuit 4, and also is arranged so as to compute the proper fuel consumptions according to each car speed. Namely, the proper fuel consumption operational circuit 5 is provided with a memory circuit 6 in which the economical fuel consumptions (1/100 km) shown by the unit of liter of fuel consumption, which are obtained in the case of running for 100 km at the transmission gear ratio optimum to the automobile driven on flat ground under the condition of a dead calm, are stored in advance. On receiving car speed signals from the car speed operational circuit 4, a proper fuel consumption corresponding to the car speed is called, selected, and transmitted to the next stage as the proper fuel consumption signals.

Accordingly, a proper fuel consumption operational circuit I, computing proper fuel consumptions responding to every momentary car speed at the time of running an automobile, is constructed by the aforesaid circuits 4, 5 and 6.

Numeral 7 designates an engine revolution operational circuit which receives engine ignition pulse signals of an automobile and is arranged so as to be able to therefrom the desired number of revolutions per minute (rpm) of engine. Numeral 8 designates a negative pressure operational circuit for computing the negative pressure (mmHg) of the intake manifold, and is arranged so as to be able to convert the negative pressure into electric signals by way of the vacuum sensor communicating with the intake manifold and to transmit negative signals computed to the next stage. Numeral 9 designates a fuel consumption rate computing circuit and is provided with a memory circuit 10 in which the number of revolutions of engine N and the fuel consumption (l/hour) per unit time under the negative pressure P of intake manifold are stored in advance. It is widely known that there is a correlation between the consumption flow quantity of fuel Q and the intake manifold negative pressure of engine P concerning the actual fuel consumption of automobile. The flow quantity Q increases in proportion to number of revolutions of intake manifold P reaches close to atmospheric pressure. Accordingly, if both the number of revolutions of engine N and the negative pressure of intake manifold P can be detected, the flow quantity Q is obtainable from the formula;

$$Q \propto P \times N \ldots \quad (1)$$

Accordingly, actual fuel consumption signals e can be transmitted by computing the above formula (1) in the fuel consumption rate computing circuit 9, transmitting the fuel consumption rate signals (l/h) to the next stage actual fuel consumption computing circuit 11, and performing division by the car speed signals sent by the car speed operational circuit 4 in the circuit 11.

An actual fuel consumption operational circuit (II) is employed for computing the actual fuel consumptions, at the time of driving an automobile, is constructed by the aforesaid engine revolution operational circuit 7, negative pressure operational circuit 8, fuel consumption rate computing circuit 9, memory circuit 10 and actual fuel consumption computing circuit 11.

Numeral 12 designates comparing circuit which compares the size of proper fuel consumption signals f with the size of actual fuel consumption signals e sent by the aforesaid both circuits (I) and (II) respectively and can transmit output signals controlling a selector 15 that changes over output signals of two sets of bar graph decoder 13 and 14.

Nameley, concerning the output signals of the comparing circuit 12;
 (i) When f>e, the circuit 12 changes a switch 16 of the selector 15 kept at a high area over to a terminal 16a communicating with the output side of OR circuit 20.
 (ii) When f≦e, the circuit 12 changes the switch 16 of selector 15 kept at a low area over to a terminal 16b communicating with the output side of EX-OR circuit 18.

The bar graph decoder 13 mentioned above is provided with connecting wires 17 corresponding to 16-piece segments 2 on its output side, is connected with a terminal 16b of the selector 15 mentioned above through the EX-OR circuit 18, and is arranged so as to transmit signals only through a connecting wire 17x corresponding to a maximum value of proper fuel consumption signals transmitted by the proper fuel consumption operational circuit (I).

The bar graph decoder 14 mentioned above is provided with connecting wires 19 corresponding to 16-piece segments 2 on its output side, is connected with a terminal 16a of the selector 15 mentioned above through the OR circuit 20, and is arranged so as to transmit signals through all connecting wires, $19_1, 19_2, \ldots 19_y$, corresponding to actual fuel consumption signals transmitted by the actual fuel consumption operational circuit (II).

Further, the output signals from both bar graph decoders 13 and 14 can be inputted in the gates of OR circuit 20 and eX-OR circuit 18 respectively; when f>e, both proper fuel consumption and actual fuel consumption are displayed on the display device through the OR circuit 20, and when f≦e, the aforesaid each fuel consumption are displayed on the display device through the EX-OR circuit 18.

Numeral 21 is a liquid-crysatl driving circuit connected with the selector 15, and is arranged so as to perform liquid-crystal display by giving optical changes to the liquid crystal to segments 2 by the connection of each segment 2 of the display device 1 mentioned above.

Based on the construction mentioned above, description is made of the action of this invention.

The car speed pulse signals, ignition pulse signals and negative pressure signals of intake manifold detected during the running of automobiles are applied constantly, at the values according to the changes of car speed, to the car speed operational circuit 4, engine revolution operational circuit 7 and negative pressure operational circuit 8, and are computed in the proper fuel consumption operational circuit (I) and the actual fuel consumption operational circuit (II) to become the respective output signals f and e, which are applied to the comparing circuit 12. At the same time the output signals f are inputted in the bar graph decoder 13 while the output signals e are inputted to the other bar graph decoder 14.

Figure 3:
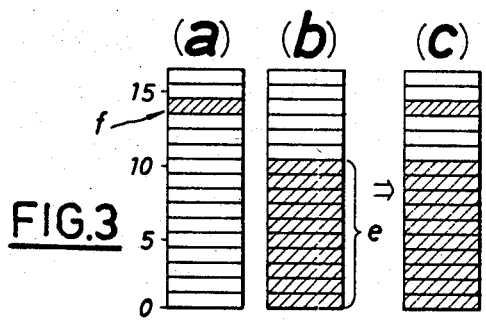
FIG. 3($a$), 3($b$) and 3($c$) and FIG. 4($a$), 4($b$) and 4($c$) are explanative views showing respectively two examples of actual fuel consumptions and proper fuel consumptions shown on the display device, wherein as to each segment of the display device, oblique line portions show the functioning state and line-less portions show the non-functioning state.

In case the output signals of proper fuel consumption f are larger than the output signal of actual fuel consumption e, the selector 15 changes its switch 16 over to the terminal 16a, and therefore the actual fuel consumption signals, transmitted through the connecting wires $19_1, 19_2 \ldots 19_y$ of the bar graph decoder 14, are applied to a liquid-crystal driving circuit 21 through the selector 15 via the OR circuit 20, and can be displayed in the state of oblique line portion in FIG. 3(b) by giving optical changes to the corresponding segments 2 of the display device 1 which are made to function in the field on which desired voltage is impressed.

Figure 2:
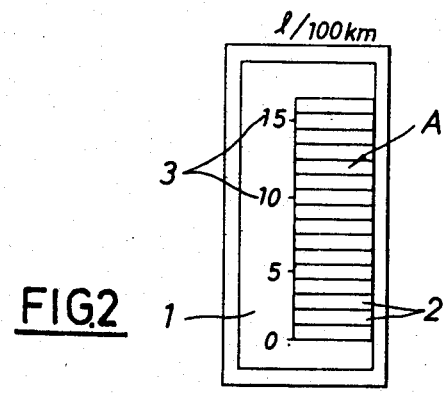
FIG. 2 is a front view of an example of the display device of bar graph construction.

And, as the proper fuel consumption signals from the bar graph decoder 13 are transmitted only through a connection wire 17x corresponding to the maximum value, the signals are applied to the liquid-crystal driving circuit 2 through the selector 15 via OR circuit 20, and can be displayed in the state of FIG. 3(a) by giving optical changes to a corresponding segment 2 of the display device 1 which is made to function in the field on which voltage is impressed. However, the display device 1 being one piece, the both signals are synthesized in the display device 1 and are displayed in the state of FIG. 2(c).

Figure 4:
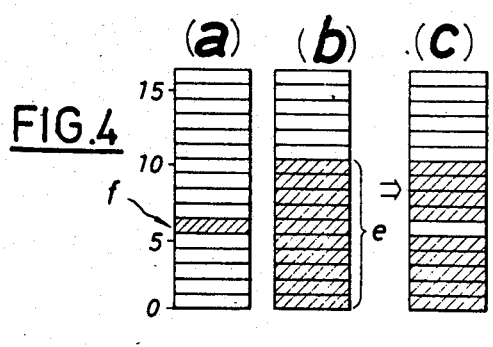

Next, in case the output signals of proper fuel consumption f are equal to or below the output signals of actual fuel consumption e, the selector 15 changes its switch 16 over to the terminal 16b influenced by the output signals of the comparing circuit 12; therefore if the proper fuel consumption signals and actual fuel consumption signals from both bar graph decoders 13 and 14 are applied individually to the display device 1 as mentioned above, the both signals result in giving optical changes to corresponding segments 2, which are made to function, and are displayed respectively in the state of oblique line portions of FIG. 4(a) and (b).

However, practically both signals are transmitted through the EX-OR circuit 18, and the signals passing through the corresponding connecting wires 17x and 19y agree with each other; therefore no output signals are obtainable. Consequently, only the segments 2 corresponding to said portions are displayed in the state of not being influenced by the impressed voltage as shown in FIG. 4(c) in the display device 1.

Therefore, the segments displaying the proper fuel consumption according to the running state of the automobile are displayed in two ways; one being the case where the segments displaying the proper fuel consumption are different from the segments displaying the actual fuel consumption, and the other being the case where the both segments are same. If the both segments are different from each other, the both segments are displayed, with optical changes being given to them. If the both segments are the same, optical changes are not given only to the segments which agree with each other and the other segments of actual fuel consumption are displayed in the state where optical changes are given to them.

In case the actual fuel consumption agrees with the proper fuel consumption, and in case the proper fuel consumption is larger by one scale than the actual fuel consumption is distinguishable from the proper fuel consumption, is not obtainable. However, the above shows the case where the running is in the optimum state or in the state close to the optimum state, and there is no problem causing any obstacle in the pratical use.

Thus, description is made on one embodiment of this invention, but this invention is not limited to the embodiment and, as a matter of course, the technical construction involved in this invention can be modified or changed according to the necessity.

In particular, the embodiment described above may be constructed by changing reversely the driving condition of each segment 2 in the display device 1.

According to this invention, as described above, two displaying items of actual fuel consumption and proper fuel consumption are incorporated into one body in the display device provided with one bar graph using liquid crystal or other luminous means. This makes it possible to make the display device quite small in size by saving the displaying space and to use in common the driving circuit for two displaying items resulting in a decrease in the cost; and moreover a driver can obtain two kinds of information on actual fuel consumption and proper fuel consumption by watching only one display device, so that this invention has an advantage of securing the safety of driving because the driver has only to release his eyes for a very short time from the road during cars operation.

And also, the driver can drive the car, comparing a proper fuel consumption with an actual fuel consumption during the operation; and this enables the driver to drive the car constantly at proper speed by shifting the gear in order to make the fuel consumption close to the proper fuel consumption, whereby the driver can enjoy comfortable driving on an economical basis.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A display unit of a fuel consumption meter for an automobile, comprising:
   a proper fuel consumption operational circuit capable of transmitting output signals indicative of proper fuel consumption according to automobile speed;
   an actual fuel consumption operational circuit capable of transmitting output signals indicative of actual fuel consumption;
   a comparing circuit for comparing the amplitudes of said output signals of said proper fuel consumption operational circuit and said actual fuel consumption operational circuit;
   bar graph decoders receiving said output signals from said proper fuel consumption operational circuit and said actual fuel consumption operation circuit;
   and EX-OR circuit having an input coupled to a respective bar graph decoder and having an output;
   an OR circuit having an input coupled to a respective bar graph decoder and having an output;
   selector means coupled to the output of said EX-OR circuit and the output of said OR circuit and controlled by an output of said comparing circuit for connecting a selective one of said EX-OR and OR circuits to an output of said selector means; and
   a bar graph display comprising plural display segments and a driving circuit for activating selected of said segments, said driving circuit coupled to the output of said selector means such that said display segments are selectively driven by the output of said EX-OR circuit or the output of said OR circuit;
   whereby said display device displays proper fuel consumption and actual fuel consumption in two modes, including a first mode in which said display device displays proper fuel consumption and actual fuel consumption by selectively driving display segments corresponding thereto and a second mode in which said display device displays actual fuel consumption and proper fuel consumption by driving selected display segments corresponding to the maximum value of said actual and proper fuel consumption and indicates at least one segment common to both said proper fuel consumption and actual fuel consumption by inhibiting driving of said at least one display segment.

* * * * *